May 11, 1926.
A. W. WATSON
SAW HANDLE
Filed March 9, 1925
1,584,157
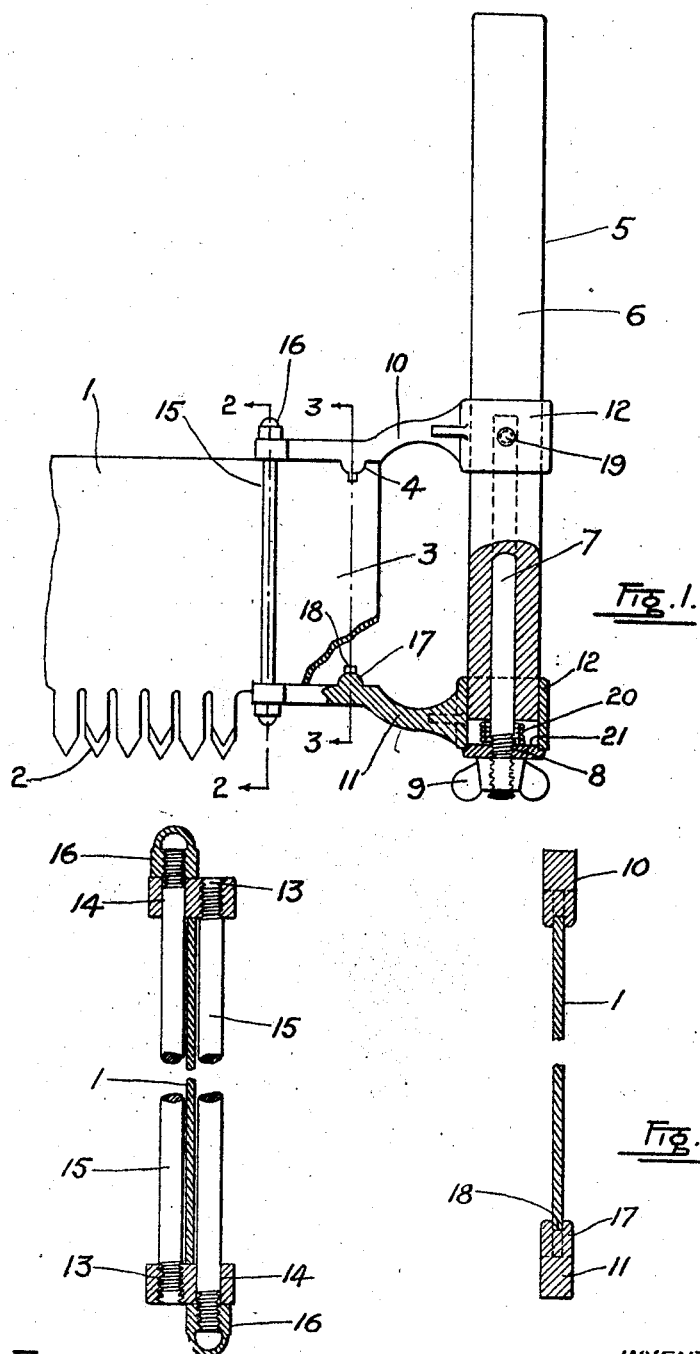
INVENTOR
ABRAHAM WHARTON WATSON
BY Fetherstonhaugh & Co
ATTORNEYS Patented May 11, 1926.

1,584,157

UNITED STATES PATENT OFFICE.

ABRAHAM WHARTON WATSON, OF VICTORIA, BRITISH COLUMBIA, CANADA.

SAW HANDLE.

Application filed March 9, 1925. Serial No. 14,300.

My invention relates to improvements in saw handles, the objects of which are to provide means whereby the saw is firmly secured to the handle to provide such adjustment that saw blades of varying widths may be conveniently fitted thereto and to provide means whereby the thrust applied by the operator shall be applied in line with the longitudinal axis of the saw.

The invention consists essentially of a hand part having a pair of connecting members adapted to embrace the opposing edges of the end of the saw blade and means for clamping the members to the saw, as will be more fully described in the following specification, in which:—

Fig. 1 is a general view of the invention showing part in section.

Fig. 2 is a sectional view taken on the line 2—2 of Figure 1.

Fig. 3 is a sectional view taken on the line 3—3 of Figure 1.

In the drawings like characters of reference indicate corresponding parts in each figure.

The numeral 1 indicates a saw blade having cutting teeth 2 along one edge. The inner end 3 of the blade is provided on opposite edges with slots 4, the purpose of which will appear later.

The numeral 5 indicates the saw handle of which 6 is a grip formed preferably of a wood shaft having a bolt 7 extending from its lower end which is threaded as at 8 to receive a thumb nut 9. A pair of connecting members 10 and 11 extend from the grip 6 to the end 3 of the saw blade 1 each of which is provided with an eye 12 at one end to engage the grip 6 and is provided at the opposite end with a pair of apertures, numbered respectively 13 and 14 spaced the thickness of the saw blade apart, each aperture 13 is threaded to receive a stud bolt 15 which extends across the face of the saw blade and passes through the aperture 14 and is capped with a cap nut 16. Intermediate the length of each connecting member is a transverse projection 17 having a longitudinal slot 18, the projection is adapted to fit into one of the slots 4 in the saw blade and the blade is adapted to be held against transverse movement in the slot 18 of the projection. The connecting member 10 is secured to the grip 6 by a pin or rivet 19 passing through its eyed end 12, which pin also serves to hold the bolt 7 in position longitudinally of the grip.

A coil spring 20 is fitted upon the end of the bolt 7 to take up any vibration during the use of the saw which might tend to loosen the thumb nut 9. The connecting member 11 is slipped onto the lower end of the grip 6 and is held in place by a flanged washer 21 engaging its eyed end 12 and secured upon the bolt 7 by the thumb nut 9.

Having thus described the several parts of my invention I will now briefly explain its attachment to a saw blade.

The inner end 3 of the saw blade is slotted on opposite edges as at 4 for the reception of the connecting members 10 and 11. The thumb nut 9 is slackened from the bolt 7 and the cap nuts are removed from the stud bolts 15, the connecting members 10 and 11 are slightly separated vertically and the free end of the saw blade inserted between the stud bolts and thrust rearwardly until the projections 17 of the connecting members engage the slots 4 of the blades, when it suffices to replace the cap nuts upon the stud bolts drawing them up finger tight, then to tighten up the thumb nut to render the handle securely fastened to the saw blade.

What I claim as my invention is:

1. A saw blade comprising a grip, a pair of connecting members extending from the grip adapted to engage a saw blade, projections upon the connecting members for holding the blade against longitudinal and lateral movement, and a pair of bolts adapted to lie in close proximity to opposite sides of the saw for connecting the free ends of the connecting members together.

2. In a device of the character described, the combination of a grip, a threaded screw at the lower end of the grip, a lower clamp member having a sleeve portion encircling the grip and slidable thereon, a follower receiving the screw therethrough and bearing against the lower end of said sleeve portion, nut means engaging the screw below said follower, an upper clamp member projecting laterally from the grip in opposing relation to the lower clamp member, and means carried by said clamp members adapted to lie at opposite sides of a saw blade secured between said members so as to prevent twisting of the blade.

3. The combination with the structure recited in claim 2 of a spring encircling said screw and confined between the follower and an opposing portion of the grip.

4. In a device of the character described, the combination of a grip equipped with a pair of opposing relatively adjustable clamp members adapted to engage opposite edges of a saw blade, a pair of bolts connecting said clamp members and spaced apart to receive the saw blade therebetween, each bolt having one end screwed into a threaded aperture of one clamp member and the other end projecting through and beyond an aligned opening in the other clamp member and a cap member threaded upon the projecting end of each bolt.

Dated at Vancouver, B. C., this 17th day of February, 1925.

ABRAHAM WHARTON WATSON.